Figure 6:
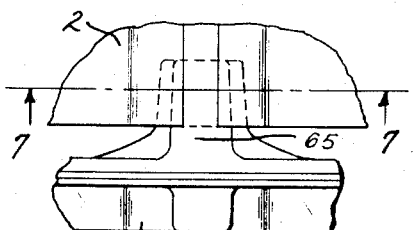

Sept. 19, 1967  L. W. WIGHTMAN ET AL  3,343,013
END SHIELD ASSEMBLY
Filed Dec. 10, 1964  2 Sheets-Sheet 1

INVENTORS:
LAWRENCE W. WIGHTMAN
FRANK S. KORSKI
CLINTON H. DEDERICK
BY
ATTORNEY.

United States Patent Office 3,343,013
Patented Sept. 19, 1967

3,343,013
END SHIELD ASSEMBLY
Lawrence W. Wightman, Creve Coeur, and Frank S. Korski and Clinton H. Dederick, Brentwood, Mo., assignors to Emerson Electric Co., St. Louis County, Mo., a corporation of Missouri
Filed Dec. 10, 1964, Ser. No. 417,428
3 Claims. (Cl. 310—42)

This invention relates to dynamo electric machines of the type in which a rotating element is journaled for rotation in bearings supported by end shields. The invention is described as applied to electric motors, but its utility is not confined thereto.

It has been common practice in the past to ensure the concentricity of the rotor and the stator bore of an electric motor either by locating their centers with respect to a stator housing and end shields which carry the bearings in which the rotor is journaled (e.g., by machining complementary surfaces on the end shield and stator housing using their radial centers as the common reference), or by shimming the rotor within the stator bore, to obtain uniform clearance, and then fastening the end shields (or their equivalent) while the stator and rotor were held in the desired relative positions. This latter system has been used with large size motors, in some of which the "end shield" took the form of exterior bearing supports, mounted on a common base with the stator housing. In smaller motors, an end shield was sometimes bolted in place before the shims were removed; in others solder or bearing metal was used to secure the end shields in the proper relationship to the stator. In any case, after the end shield had been mounted, the shims or spacers were removed.

The present invention has to do with an improvement in the second type of assembly of motors, in which the desired spacing of the rotor and bore-defining wall of the stator is obtained by shimming.

With the advent of adhesives which are capable of bonding metal to metal, such, for example, as the epoxy resins now in common use, it was obvious to those skilled in the art that old methods of using solder or bearing metal, or even of bolting end shields in the assembly of motors with the shimming process, could be more easily accomplished by using the adhesives. This is because solder is not strictly an adhesive, and its use, therefore, usually involved some keying arrangement, to ensure that the parts stayed together. Spot welding, which had also been used, and even bolting, tend to set up strains and stresses which make uniformity difficult to obtain. On the other hand, the epoxies can be cured at temperatures which do not produce distortion, and bond so firmly as to make dove-tailing or other keying arrangements unnecessary. Accordingly, the motor industry is adopting the practice of adhering or "cementing" various parts of the motors together, including the end shields on the stator core or stator housing.

The various metal to metal adhesives have in common that they are more able to resist compression and shear than they are to resist tension.

One of the objects of this invention is to provide a dynamo electric machine with end shields which support bearings in which a rotating element is journaled, which end shields are cemented to a core housing in such a way as to stress the cement by which they are joined in substantially only shear and compression.

Another object is to provide such an assembly which is simple economical and effective.

Other objects will become apparent to those skilled in the art in the light of the following description and accompanying drawings.

In accordance with this invention, generally stated, a dynamo electric machine is provided with end shields having axially projecting mounting tabs, which extend into channels on a core structure. The tabs extend within the compass of the channel defining surfaces, but are not in immediate contact with them. Instead, the tabs are mounted in beds of cement, which, bonded to the channel-defining surfaces and the tabs, secure the tabs within the channels.

Preferably, the channels are formed in the stator core of a motor, and open outwardly from the periphery of the stator core.

In the preferred embodiments described, the stator core is square and the channels are formed in bevelled corners of the core, in such a way that the radial width of iron in the corners is no less than that in the centers of the square. In the preferred illustrative embodiment first described, the surface defining the bottom of the channels is provided with a secondary central groove within which a clamping strap is mounted by which the stator laminations are clamped together.

Further, in the first preferred embodiment shown and described, the tabs are tapered convergently inwardly toward their free ends.

In another embodiment, the channels are defined by a T section on the stator core, and inboard-opening axially extending C-shaped channel tabs on the end shield embrace the head of the T, with facing flanges extending into the T-channels. In still another embodiment, the channels are defined by teeth on the stator core perimeter which extend generally radially with respect to the center of the stator bore, and receive between them radially inwardly extending fingers on axially extending tabs on the end shield. In this latter embodiment, the radially extending surfaces of the mating core and end shield parts are in shear or compression with respect to external forces exerted on the parts.

It can be seen also, that the reverse configuration is possible, though not as practicable, i.e., that the stator core be provided with tabs and the end shield with channel-defining elements.

Figure 3:
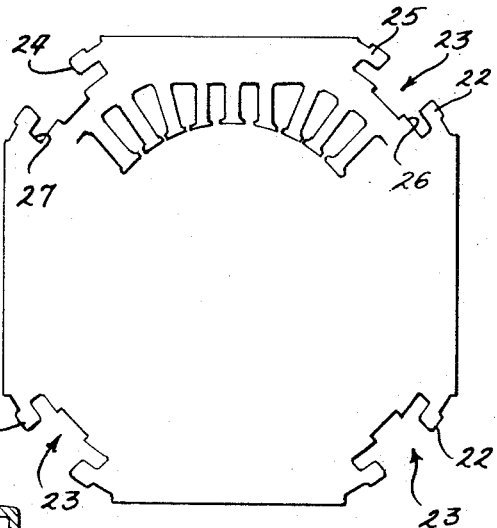
Figure 5:
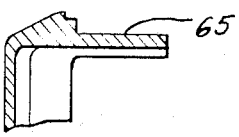
Figure 1:
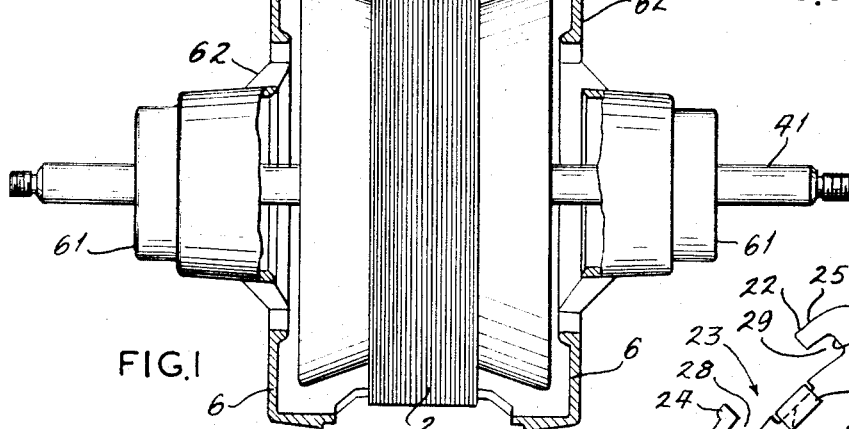
Figure 4:
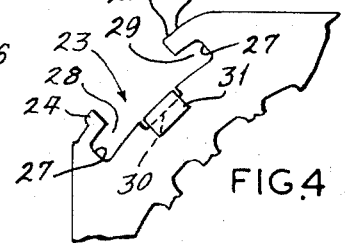
Figure 2:
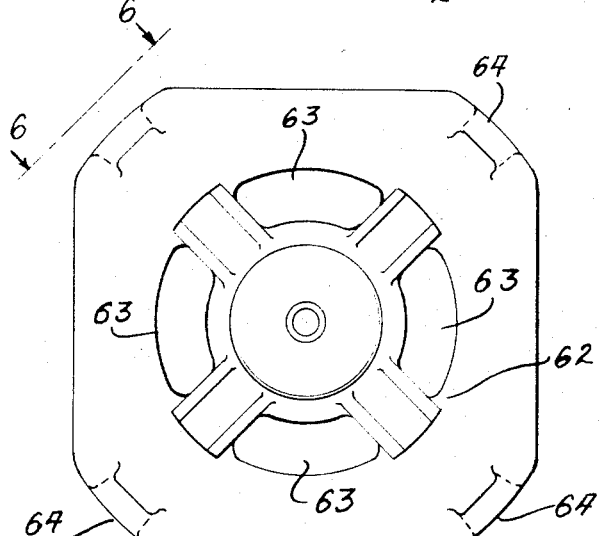
Figure 7:
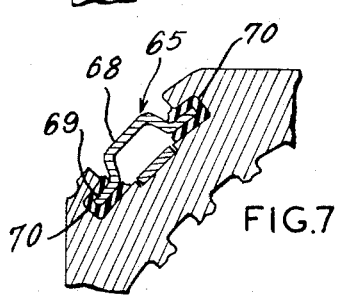
Figure 8:
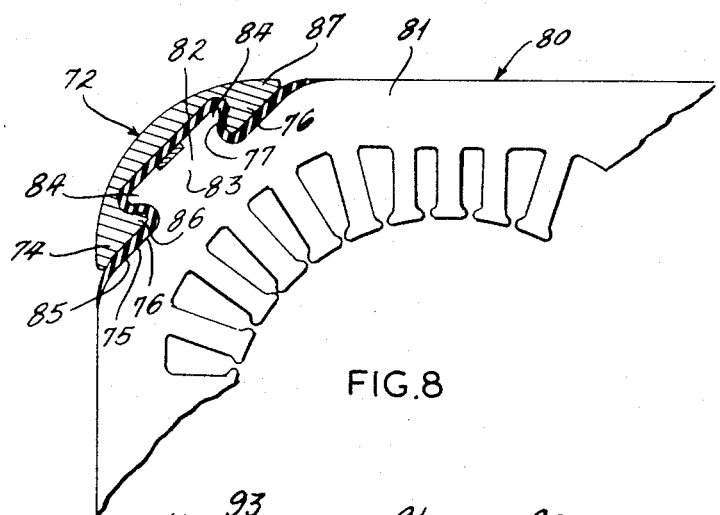
Figure 9:
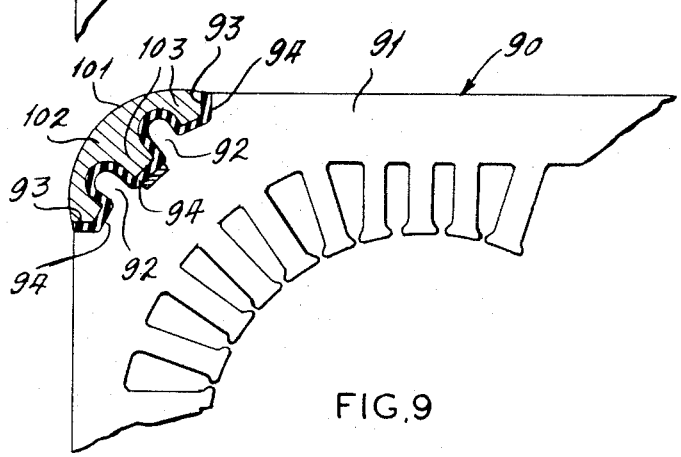

In the drawing, FIGURE 1 is a top plan view of one embodiment of motor of this invention;
FIGURE 2 is a view in end elevation of the motor shown in FIGURE 1;
FIGURE 3 is an end view of the stator core of the motor shown in FIGURES 1 and 2 before the end shields are mounted, but with windings and winding slots omitted;
FIGURE 4 is an enlarged fragmentary view in end elevation of a corner of the stator core shown in FIGURE 3;
FIGURE 5 is a fragmentary view in side elevation of an end shield before its assembly on the stator;
FIGURE 6 is a fragmentary view, taken along the line 6—6 of FIGURE 2;
FIGURE 7 is a sectional view taken along the line 7—7 of FIGURE 6;
FIGURE 8 is a fragmentary sectional view of one corner of another embodiment of motor of this invention, showing in plan a radial end face of a stator core and in section an end shield tab; and
FIGURE 9 is a fragmentary sectional view of one corner of still another embodiment of motor of this invention, showing in plan a radial end face of a stator core and in section an end shield tab.

Referring now to FIGURES 1-7 of the drawing for one illustrative embodiment of dynamo electric machine of this invention, which, in the drawing, is in the form of an AC motor, reference numeral 1 indicates a completed motor of this invention. The motor 1 is made up of a stator 2, a rotor 4 and end shields 6.

The rotor 4 has a shaft 41 journaled for rotation in bearings 61 mounted in and carried by the end shields 6.

The stator 2 is made up of a multiplicity of laminations 21, identical with one another and aligned axially so as to define axially extending slots for the windings of the motor, and to define, at its four bevelled corners 22, axially extending channels 23. The channels 23 are defined by oppositely disposed inwardly overhanging flanges 24 and 25, a bottom wall 26 and inner side walls 27. The undersides of the flanges 24 and 25, the bottom wall 26 and the inner side walls 27 define between them grooves 28 and 29. The channel 23 opens outwardly through the peripheral wall of the stator core 2. A secondary central groove 30, receives a clamp strap 31, by which the laminations making up the stator core are secured.

Each of the end shields 6, in the illustrative embodiment shown, has a central supporting web 62 within which are symmetrically arranged openings 63. The end shield 6 is square-sided with diagonal corners 64, with which mounting tabs 65 are integral. The mounting tabs 65 are cantilevered, i.e., supported at only one end on the end shield 6, and project axially inwardly, at substantially right angles to the plane of the end shield 6, and extend into the channel 23, with their outwardly long edges within the grooves 28 and 29. In the embodiment shown, the tabs 65 are tapered convergently axially outwardly, and shaped with a central, integral, outwardly bulged rib 68 bounded on either side by tab margins 69. The tab margins 69 project into the grooves 28 and 29.

The grooves 28 and 29 are filled, at least along the length of the tab margins 69 within them, with a cementing material 70, the preferred form of which is epoxy resin of the type commonly used to adhere metals and to coat stators. It will be observed, especially from FIGURE 7, that the cementing material 70 surrounds the edges of the margins 69, so that the tabs 65 are bedded in the cementing material and do not come into direct contact with the stator core. Because the adhesive is both outboard and inboard of the tab margins, the end shield is held against movement transversely of the stator core. Thus, a joint is formed which is subjected in use only to shear and compression strains, and which admits of the most delicate and yet permanent alignment adjustments. The range of adjustment is limited only by the clearance of the tab margins within the stator channels when the end shield tabs are inserted therein.

In manufacturing the motor of this invention, the stator core is assembled, treated and wound; an unset, pasty adhesive is put into the grooves 28 and 29; the rotor is put into the stator bore and positioned axially; shims or spacers are placed between the stator bore defining surface of the stator and the facing surface of the rotor, to hold the rotor in its proper spaced and centered position with respect to the stator, the shims being positioned circumferentially to be within the reach of the openings 63 and to project axially through them; the end shields are slipped onto the respective ends of the shaft of the rotor; the tabs 65 are forced into the channels 23 with the tab margins within the adhesive in the grooves 28 and 29; the adhesive is set, as by heating, and the shims are pulled.

The steps of this process can, of course, be varied. For example, the adhesive may be put into the grooves after the rotor is shimmed or the rotor may even be shimmed after the end shields have been put on the rotor shaft.

Referring now to FIGURE 8 for another embodiment of motor of this invention, reference numeral 80 indicates a motor which in respect of the rotor, shaft, bearings, stator teeth and even end shield, except for mounting tabs, can be identical with the motor shown in FIGURES 1–7. In the motor 80, a square stator core 81 is provided at each of four beveled corners with a T section 82 which has a stem 83, and two outwardly facing flanges 84 each of which, with the adjacent edge of the stem 83 and a shoulder 85 of the corner of the stator core, defines a channel 86.

A tab 72, one of four integral with an end shield, is C shaped in section, with a web 73 bridging the head of the T section and feet 74 providing a flat surface 75 on each side of the T, complementary to the shoulder 85 of the core, and toes 76 projecting into the channels 86.

As in the embodiment shown in FIGURES 1–7, the tabs 72 are not in surface to surface contact with the core structure, but are bedded in a cement 77. It can be seen that a part of the toes 76 is always in compression or shear, no matter what the direction of external force applied to the tab.

In FIGURE 9, a motor 90 is shown in which a square stator core 91 has four beveled corners, each of which has teeth 92 which, with shoulders 93, define channels 94. A tab 101, integral with an end shield, has an arcuate web 102 and, in the illustrative embodiment shown, three radially inwardly extending fingers 103. The fingers 102, like the toes 76 of the second embodiment and the tabs 65 of the first, do not come into surface to surface contact with the stator core. The fingers 103 are bedded in cement 97. In this embodiment, the radial surfaces of the fingers and teeth ensure that the cement over part of the tab will always be in shear or compression, no matter what the direction of external force applied to the tab.

The embodiments of motors shown in FIGURES 8 and 9 are assembled in essentially the same way as the motor of FIGURES 1–7.

Numerous variations in the construction of the motor of this invention, within the scope of the appended claims, will occur to those skilled in the art in the light of the foregoing disclosure. For example, in the first embodiment, the edge of the tab margins 69 can be serrated for additional resistance to axial movement. The tapering of the tabs is an aid to their insertion into the plastic adhesive bed, but may be omitted, with the loss of this advantage, particularly if the adhesive is forced, around the tab margins, into the grooves, after the end shield has been put into place. The tabs can be made solid to provide the rib 68, and generally are when the end shield is cast. In the embodiment of motor shown in FIGURE 9, more or fewer teeth and fingers can be provided. Combinations of the various embodiments can be used. For example, two or more teeth or shoulders of the embodiment shown in FIGURE 9 can be undercut and the fingers dovetailed or bent re-entrantly to provide a modified version of the embodiments shown in FIGURES 1–7 and 8. These are merely illustrative.

Having thus described the invention what is claimed and desired to be secured by Letters Patent is:

1. In an electric motor having a square, laminated, stator core with four beveled corners and a metal end shield, the improvement comprising axially projecting mounting tabs integral with said end shield, said tabs having edge margins tapering convergently toward the free end of the tabs, channel-defining flanges integral with said stator core at each of said four beveled corners of said core, said flanges facing one another and overhanging a portion of the peripheral surface of the core at the beveled corners of the core to define a groove along each flange, said flanges being spaced apart a distance greater than the amount of their respective overhangs, which flanges, with said peripheral surface as a bottom wall, define at each of said beveled corners an axially extending channel, said end shield tabs extending within the compass of but free of direct contact with the channel-defining surfaces, with said tab margins within the said grooves and said tabs spanning between the overhanging flanges, and a cementing composition within the grooves between the said tab margins and the channel-defining surfaces, bonded to said tabs and to said channel-defining surfaces and bonding them together.

2. The improvement of claim 1 wherein the mounting tabs on said end shield have a central rib part extending outboardly of the inboard margin of the overhanging flanges of the stator and said tab margins lie on either side of said central rib part.

3. The electric motor of claim 1 wherein a stator core clamp strap is mounted along the channel bottom defining wall.

References Cited

UNITED STATES PATENTS

| | | | |
|---|---|---|---|
| 1,771,475 | 7/1930 | Wright | 310—254 |
| 2,610,225 | 9/1952 | Korski | 310—217 |
| 3,145,313 | 8/1964 | Tupper | 310—42 |
| 3,176,172 | 3/1965 | Thompson | 310—43 |

FOREIGN PATENTS 842,316  7/1960  Great Britain.

MILTON O. HIRSHFIELD, *Primary Examiner.*

J. W. GIBBS, *Assistant Examiner.*